Figure 1:
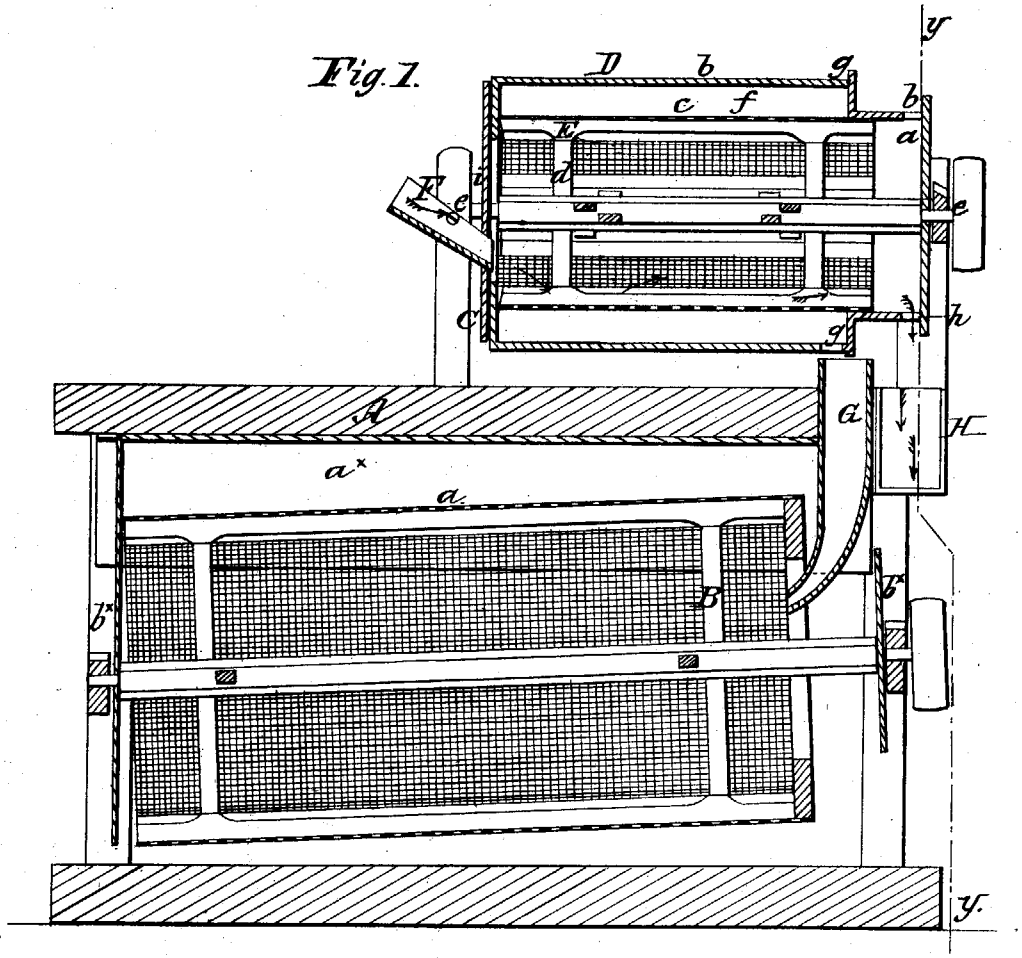

2 Shetes—Sheet 1.

D. LANDIS.

Screen for Flour Bolts.

No. 1,328.

Reissued Aug. 19, 1862.

Witnesses.

H. A. Coomly

L. W. Rendré.

Inventor.

David Landis.

per Munn & Co.

Attorneys.

N. PETERS, Photo-Lithographer, Washington, D. C.

2 Shetes—Sheet 2.
D. LANDIS.
Screen for Flour Bolts.
No. 1,328.
Reissued Aug. 19, 1862.
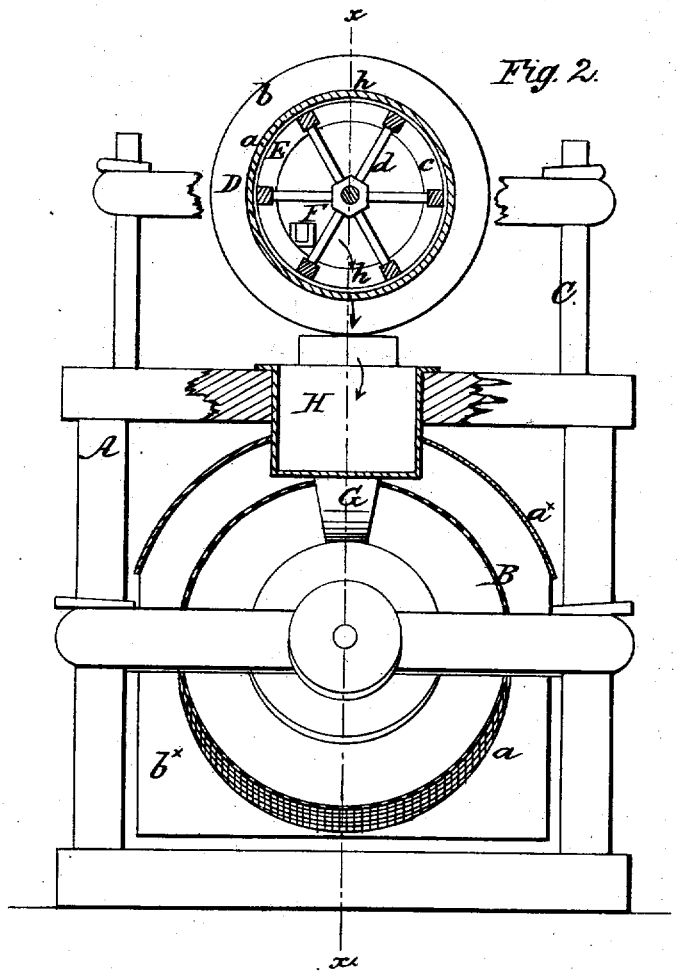
Witnesses.
D. W. Coombs
L. W. Bendré.
Inventor.
David Landis,
per Munn & Co
Attorneys
N. PETERS, Photo-Lithographer, Washington, D. C.

UNITED STATES PATENT OFFICE.

DAVID LANDIS, OF LANCASTER, PENNSYLVANIA.

IMPROVEMENT IN SCREENS FOR FLOUR-BOLTS.

Specification forming part of Letters Patent No. 30,483, dated October 23, 1860; Reissue No. 1,328, dated August 19, 1862.

*To all whom it may concern:*

Be it known that I, DAVID LANDIS, of Lancaster, in the county of Lancaster and State of Pennsylvania, have invented a new and improved screen attachment to be applied to flour-bolts for the purpose of preventing the entrance of bugs therein; and I do hereby declare that the following is a full, clear, and exact description of the same, reference being had to the accompanying drawings, making a part of this specification, in which—

Figure 1 is a longitudinal vertical section of my invention, taken in the line *x x*, Fig. 2; Fig. 2, a transverse vertical section of the same, taken in the line *y y*, Fig. 1.

Similar letters of reference indicate corresponding parts in the two figures.

The invention consists in the employment or use of a rotating screen and box placed above the bolt-chest and a metal lining placed within the bolt, all arranged to effect the desired end, as hereinafter fully shown and described.

To enable those skilled in the art to fully understand and construct my invention, I will proceed to describe it.

A represents a bolt chest, and B the bolt fitted therein. This bolt is covered with bolting-cloth, *a*, and is placed in an inclined position within the chest, the same as usual. These parts, being constructed and arranged in the ordinary way, do not require a minute description. On the bolt-chest A there is placed a framing, C, in which a cylinder, D, is fitted and placed. This cylinder is allowed to rotate freely in the framing C, and the outer part of the framing, as shown at *a*, is rather smaller in diameter than the other portion, *b*, as shown clearly in Fig. 1. Within the cylinder D there is placed a cylindrical wire screen, E. This screen is formed of wire-cloth, *c*, stretched over a proper reel or frame, *d*. The screen E extends the whole length of the part *b* of the cylinder D, and the outer end of the screen just fits within the smaller part *a* of the cylinder D, and the journals *e* of the screen E form the journals of the cylinder D, the screen being stationary within the cylinder. Between the wire-cloth *c* of the screen E and the part *b* of the cylinder D there is a space, *f*, and the part *b* of the cylinder at its outer end or junction with part *a* has holes *g* made in it. The outer part of *a* is also perforated by two or more holes, *h*.

F is a spout which leads into the cylinder D, the lower end of said spout passing through a circular disk, *i*, which forms a head or cover to the cylinder D. The cylinder D and screen E are slightly inclined, the depressed ends being over the spout G. The spout G passes through the upper part of the chest A and leads into the bolt B. Said spout directly under the holes *g* in the part *b* of the cylinder H is a box, which is attached to the chest A and is directly under the holes *h* in the part *a* of the cylinder.

The operation is as follows: The meal—that is to say, the flour and bran—as it comes from the stones, passes into the spout F, which conducts it into the screen E. The cylinder D and bolt B are rotated by any convenient power. The meal passes through the screen E into the space *f* and down through the holes *g* into the spout G, which conducts it into the bolt B, while the bugs which cannot pass through the screen E are discharged into the smaller part *a* of the cylinder D and pass out through the holes *h* into the box H. The bolt-chest A is lined with metal, *a**, which may be of semicircular or arch form at its upper part, extending fully over the bolt, as shown in Fig. 2. Metal end pieces, *b**, which also form a part of the lining, are placed at the ends of the bolt-chest. By this means the bolt B will be protected from bugs, which might otherwise enter directly into the bolt-chest, or by other ways than through the spout G. This feature is equally as important as the screen previously described, as the bolt is liable to be reached by the bugs in both ways—that is to say, by passing through the spout G and by passing directly into the chest A through the openings at its ends or through any crevice that may chance to be in it. Thus by this simple arrangement the bolt is preserved, the bugs being entirely excluded from it.

Having thus described my invention, what I claim as new, and desire to secure by Letters Patent, is—

1. The rotating cylinder D and screen E, the latter being placed within the former, and both arranged essentially as shown, to operate as and for the purpose set forth.

2. The metal lining *a** *b** within the bolt-chest, for the purpose herein specified.

3. The combination of the cylinder D, screen E, and metal bolt-chest lining *a** *b**, as and for the purpose set forth.

DAVID LANDIS.

Witnesses:

D. B. BARTHOLOMEW,

J. B. LIVINGSTON.